F. J. HAMLIN.
DEEP WELL PUMP.
APPLICATION FILED APR. 20, 1917.
1,294,654.
Patented Feb. 18, 1919.
3 SHEETS—SHEET 1.
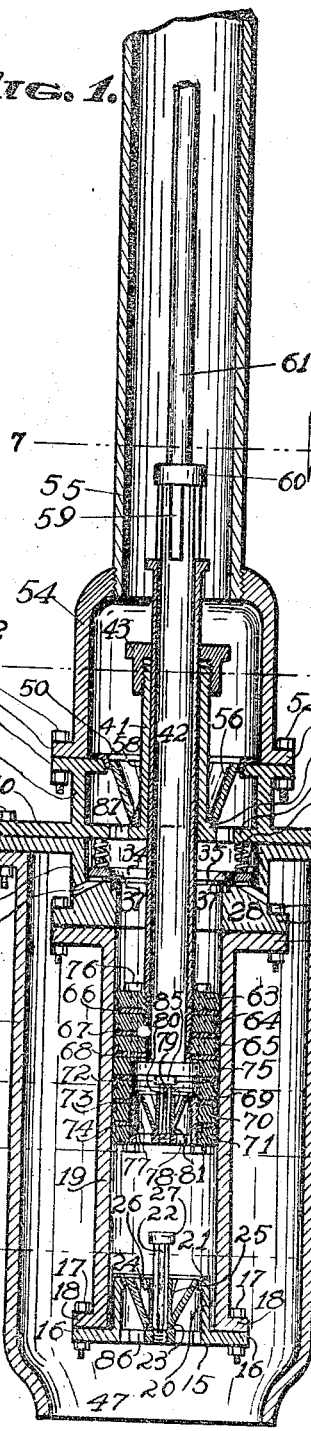
FIG. 1.
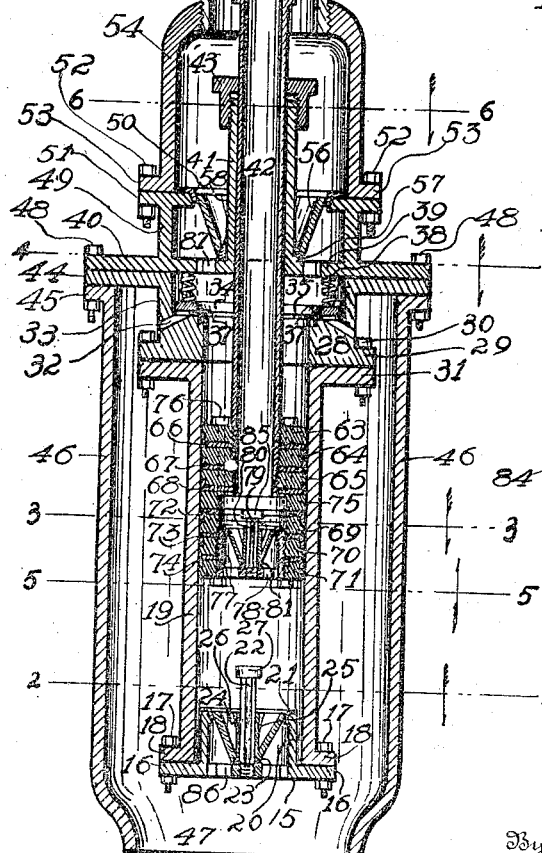
FIG. 2.
FIG. 3.
Inventor
Fred J. Hamlin
By W. F. Davidson
Attorney

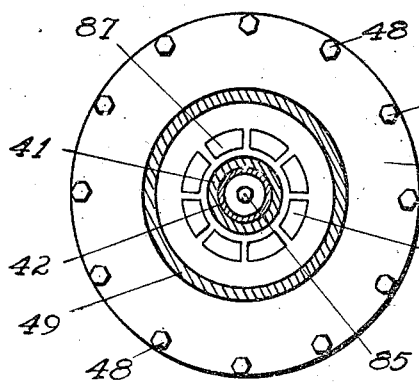
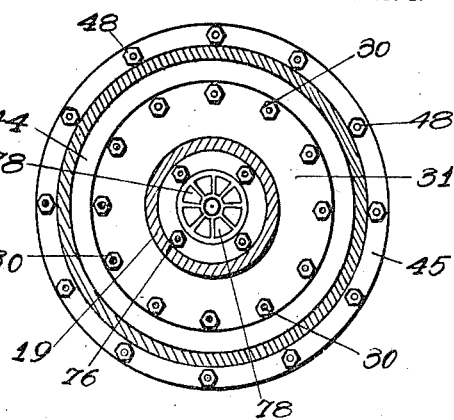
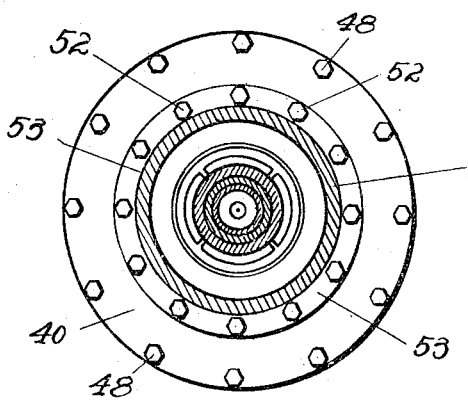
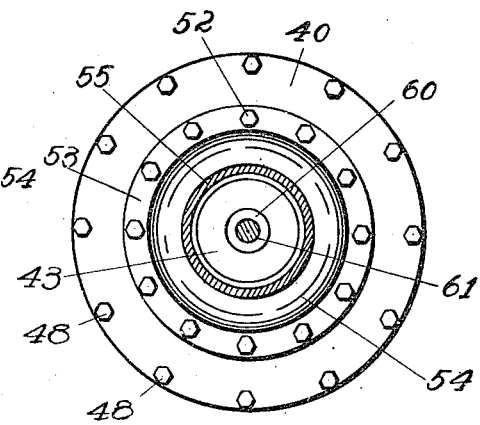
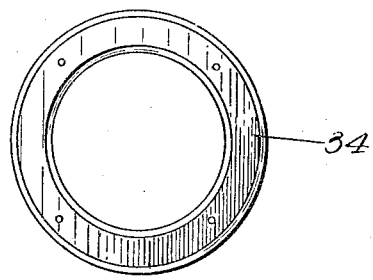

F. J. HAMLIN.
DEEP WELL PUMP.
APPLICATION FILED APR. 20, 1917.

1,294,654.

Patented Feb. 18, 1919.
3 SHEETS—SHEET 3.

Inventor
Fred J. Hamlin
By W. F. Davis & Son
Attorney

UNITED STATES PATENT OFFICE.

FRED J. HAMLIN, OF KANSAS CITY, MISSOURI.

DEEP-WELL PUMP.

1,294,654.   Specification of Letters Patent.   Patented Feb. 18, 1919.

Application filed April 20, 1917. Serial No. 163,376.

*To all whom it may concern:*

Be it known that I, FRED J. HAMLIN, a citizen of the United States, residing at Kansas City, in the county of Jackson and State of Missouri, have invented certain new and useful Improvements in Deep-Well Pumps, of which the following is a full, clear, and exact description, such as will enable others skilled in the art to which it appertains to make and use the same.

This invention relates to double acting pumping cylinders, and more particularly to deep well pumps.

An object of the improved invention is to provide a pump that will pump water containing a small quantity of sand without clogging or rendering the pump inoperative.

Another object of the improved invention is to construct a hollow plunger rod with a valveless unobstructed discharge end so that the water may flow freely therethrough without great resistance.

Another object of the improved invention is to construct a pump that will reduce the so called valve knocking which is so detrimental and destructive to the operation of deep well pumps.

Another object of the improved invention is to construct a pump provided with as free passageway as possible to reduce the resistance when water is pumped therethrough.

Another object of the improved invention is to provide a valve in the piston of the pump for the purpose of discharging water from the cylinder into the discharge pipe formed by the hollow piston rod.

Another object of the improved invention is to provide a pump with a large ring valve to open and close a series of circumferentially arranged intake ports.

With these and other objects in view the invention consists in the features of construction, combinations and arrangements of parts hereinafter described, illustrated in the accompanying drawings and more particularly pointed out in the appended claims.

In the drawings:—

Figure 1, is a view in elevation of the improved pump with certain parts broken away to show the interior thereof.

Fig. 2 is a sectional view taken on line 2—2 of Fig. 1.

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 1.

Fig. 6 is a sectional view taken on line 6—6 of Fig. 1 and showing a plan of the discharge valve.

Fig. 7 is a sectional view taken on line 7—7 of Fig. 1.

Fig. 8 is a plan view of the flat ring valve to operate the series of circumferentially arranged ports.

Fig. 10 is a fragmentary view in elevation of Fig. 8.

Figure 9:
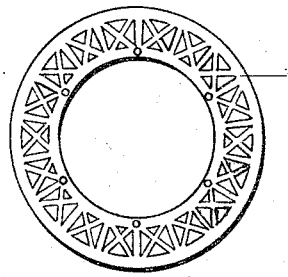
Fig. 9 is an enlarged plan view of the valve seat ring.
Figure 11:
Fig. 11 is a view in elevation of Fig. 9.
Figure 12:
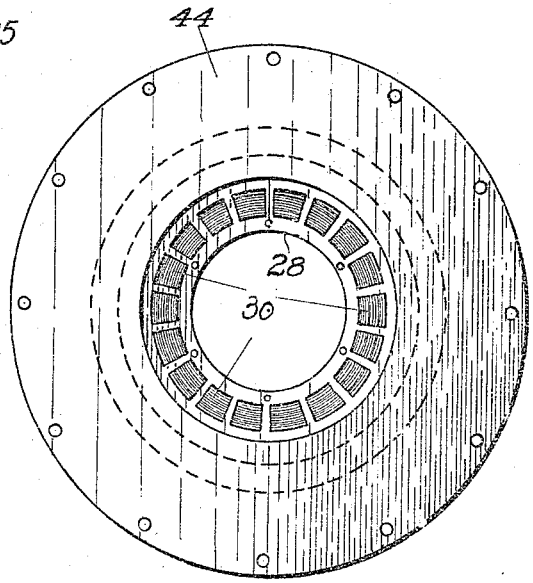
Fig. 12 is an enlarged plan view of the casting provided with the series of circumferentially arranged intake ports.
Figure 13:
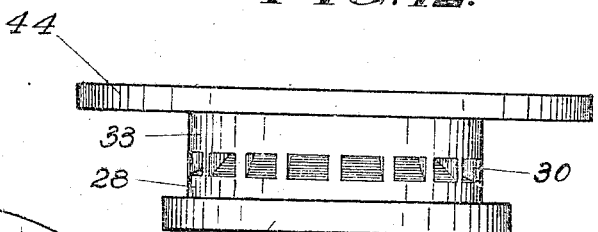
Fig. 13 is a view in elevation of Fig. 12.
Figure 14:
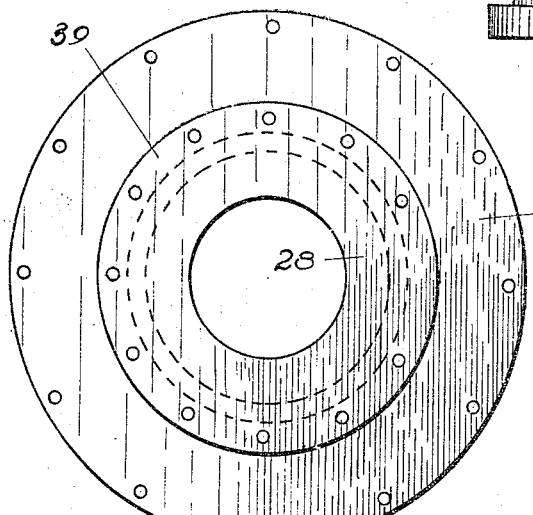
Fig. 14 is an inverted plan view of Fig. 12.

The bottom head 15 with integral outwardly extending annular flange 16 is secured by bolts 17 to the annular flange 18 integral with cylinder 19 and is provided with a series of circumferentially arranged openings 86 and an upwardly extending annular flange 20, the upwardly extending annular flange protruding into the cylinder and forming a support for the valve seat 21 and the center of the bottom head provided with a threaded hole to receive the fluted guide rod 22, the valve seat 23 being tightly fitted on rod 22 and against the upper surface of the bottom head 15.

The frusto-conical shaped valve 24 seating on seats 21 and 23 is provided with a boss 25 integrally connected to the frusto-conical shaped valve by ribs 26, the valve sliding up and down on fluted rod 22 and the sliding movement being limited by and between head 27 of the rod 22 and the valve seats 21 and 23. The object of the fluted rod being to allow sand to pass between the boss and rod and prevent binding and clogging.

The intake port casting 28 with lower annular flange 29 is secured by bolts 30 to annular flange 31 integral with cylinder 19, the series of ports 32 circumferentially arranged and allowing a greater volume of water to enter with less resistance than in ordinary pumps.

The wall 33 integral with and extending upwardly from the port casting 28 forms a guide for the flat ring valve 34 seating on seat 35 secured to the casting by screws 36 through holes 37 and are held thereagainst by springs 38, the springs compressed against the ring by the upper end bearing against the upper cylinder head casting 39.

The upper cylinder head 39 is provided with a series of circumferentially arranged openings 87, long integral bearing 41 extending upward and forming a bearing for the hollow plunger rod 42, the bearing being made water tight on the plunger rod by stuffing box 43.

The flange 40, flange 44 integral with wall 33, and flange 45 integral with jacket 46 extending downward inclosing the entire cylinder and merging inward below the bottom of the pump forming a water intake opening 47, are bolted together by bolts 48.

The wall 49 integral with and rising upward from the upper head casting forming a support for the valve seat 50 merges into a flange 51 bolted by bolts 52 to the flange 53 integral with the reducer 54 which is screwed on the well pipe 55.

The valve 56 seating on seats 50 and 57, the latter tightly fitted on boss 41 and against upper head 39, is provided with integral ribs 58 which are arranged to loosely slide on the boss 41.

The hollow plunger rod 42 is free from valves or other obstructions near the upper end and provided with slotted openings 59 to discharge water while the extreme upper end 60 is internally threaded to screw onto the end of the connecting plunger rod 61, the lower end of the plunger rod 42 being threaded and engaging rings 63, 64 and 65 separating leather washers 66, 67 and 68 while rings 69, 70 and 71 separate leather washers 72, 73 and 74.

The leather washers 66, 67 and 68 are turned upward compressing against the side of the cylinder while washers 72, 73 and 74 are turned downward compressing against the cylinder, the washers turned upward forming packing rings for the upward stroke and the washers turned downward form packing rings for the downward stroke, the washers 68 and 72 being separated by ring 75.

The rings 63, 64, 65, 75, 69, 70 and 71 and washers 66, 67, 68, 72, 73 and 74 are secured together by bolts 76.

The piston valve frame 77 provided with openings 78 and screwed into the lower rings 69, 70 and 71 supports the valve seat 79 driven on the fluted valve guide rod 80 screwed into the center of the frame 77 and the valve seat 81 fits tight on rod 80 against frame 77.

The piston valve 82 integrally connected with boss 83 by ribs 84 is arranged to slide on rod 80, the movement of the valve being limited by head 85 and valve seats 79 and 81.

In operation on each upward stroke the piston sucks water through the jacket opening 47, openings 86 raising valve 24 and passing into the cylinder until the piston reaches the top of the stroke.

On the downward stroke the water drawn into the cylinder by the lower valve 24 closes the valve and is forced upward through the openings 78, valve 82, pipe 42, slotted openings 59 and upward through pipe 55.

On each downward stroke the piston sucks water through ports 32 raising the ring valve 34 and filling the cylinder with water until the piston reaches the bottom of the stroke and on returning closes the ports 32 by compressing ring valve 34 against valve seat 35 and forcing the water through openings 87 in the upper cylinder head 39 then raising valve 56 passing upward through reducer 54 and upward through pipe 55.

The chief advantage of the construction and operation hereinbefore described is in the durable construction of the parts and arrangements of the wide openings which serve as ports and are as free from resistance as possible.

Having thus described my invention, what I claim as new and desire to secure by Letters Patent, is:—

1. In a pump, a cylinder provided with an annular flange on the upper and lower ends thereof, a lower head provided with an annular flange secured to the lower flange of said cylinder, an intake casting provided with a series of intake ports and an upper and lower annular flange, the lower flange of said casting secured to the upper flange of said cylinder, an upper head provided with an annular flange secured to the upper flange of said casting, a frusto-conical valve arranged in said lower head, a ring valve covering the series of intake ports in said casting, an outlet through said upper head, a valve above said upper head, a piston in said cylinder, a hollow piston rod connecting said cylinder, a valve in the lower end of said piston, unobstructed openings near the upper end of said piston rod and said piston arranged to slide to and fro in said cylinder.

2. In a double acting deep well pump, a cylinder, an upper head on said cylinder, a lower head attached to the lower end of said cylinder, a plunger in said cylinder, an intake valve in said lower head, an intake valve in said upper head, a discharge valve in the lower end of said plunger, a discharge valve arranged above said upper intake valve, and a sleeve connecting through suitable connections to said upper head and surrounding said cylinder and extending below said cylinder and lower head so that extension pipes may be secured to said sleeve and so that the pump may operate without submerging the cylinder.

3. In a deep well double acting pump, a cylinder, an intake valve in the bottom of said cylinder, a plunger in said cylinder, a discharge valve in said plunger, a hollow plunger rod leading upward from said plunger, an inlet valve casting on the upper end of said cylinder, said inlet valve casting provided with a cylindrical recess opening upward, a ring inlet valve in said recess, inlet parts extending from below said ring inlet valve diametrically outward through said inlet valve casting, an upper head over said inlet valve casting, compression springs bearing downwardly on said ring valve and upwardly against said upper head, discharge ports in said upper head, said upper head provided with an integral upwardly extending annular flange, a radial flange extending inwardly from the upper edge of said annular flange, a circular V shaped seat in said radial flange, a boss extending upwardly and centrally from said upper head, a seat around said boss on said upper head, a discharge valve serving said V shaped seat and said last mentioned seat, a cap casting connecting to said upper head above said annular flange, and a discharge pipe connecting to said cap casting and leading upwardly.

4. In a double acting deep well pump, a cylinder, a reciprocating plunger in said cylinder, suitable intake valves serving said cylinder, a discharge valve above said cylinder and serving the upward stroke of said plunger, connections connecting the upper end of said cylinder to an upwardly extending discharge pipe, a plunger head in the lower end of said plunger, said plunger head provided with an upwardly extending annular flange and with ports connecting to the interior of said flange, a stem in said plunger head, a plunger discharge valve surrounding said stem and slidable thereon, a V shaped circular seat in the upper end of said annular flange, and said plunger discharge valve serving said seat.

FRED J. HAMLIN.

Copies of this patent may be obtained for five cents each, by addressing the "Commissioner of Patents, Washington, D. C."